United States Patent
Yamaguchi et al.

(10) Patent No.: US 7,301,324 B2
(45) Date of Patent: Nov. 27, 2007

(54) RECORDING MEDIUM DETECTING SYSTEM

(75) Inventors: Shoji Yamaguchi, Kanagawa (JP); Yasunori Koda, Kanagawa (JP); Kunihiro Takahashi, Kanagawa (JP); Mario Fuse, Kanagawa (JP); Tsukasa Matsuda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/477,566

(22) Filed: Jun. 30, 2006

(65) Prior Publication Data
US 2007/0145967 A1    Jun. 28, 2007

(30) Foreign Application Priority Data
Dec. 26, 2005    (JP)    ............................ 2005-373350

(51) Int. Cl.
*G01R 19/00*    (2006.01)
(52) U.S. Cl. ................. 324/76.11; 324/71.1; 324/228; 324/232; 324/607
(58) Field of Classification Search ............ 324/76.11, 324/71.1, 607, 228, 232
See application file for complete search history.

(56) References Cited

U.S. PATENT DOCUMENTS 4,734,644 A * 3/1988 Imakoshi et al. ........... 324/252

5,331,278 A * 7/1994 Evanson et al. ............ 324/232

FOREIGN PATENT DOCUMENTS

JP    A-2004-285524    10/2004

* cited by examiner

*Primary Examiner*—Vincent Q. Nguyen
(74) *Attorney, Agent, or Firm*—Morgan, Lewis & Bockius LLP

(57) ABSTRACT

A recording medium detecting system includes a magnetic field-generating unit that generates an alternating magnetic field in a predetermined particular region, a detecting unit provided close to the particular region, that detects a change in magnetic flux density not smaller than a predetermined magnetic-flux-density difference B2, and a recording medium, containing multiple magnetic wires made of a magnetic material and formed in a wire shape having a predetermined length, that causes a large Barkhausen effect when the alternating magnetic field is applied. A magnetic-flux-density difference B1 detected by the detecting unit at an installation position thereof when the recording medium is placed in the particular region is not smaller than the magnetic-flux-density difference B2.

13 Claims, 10 Drawing Sheets

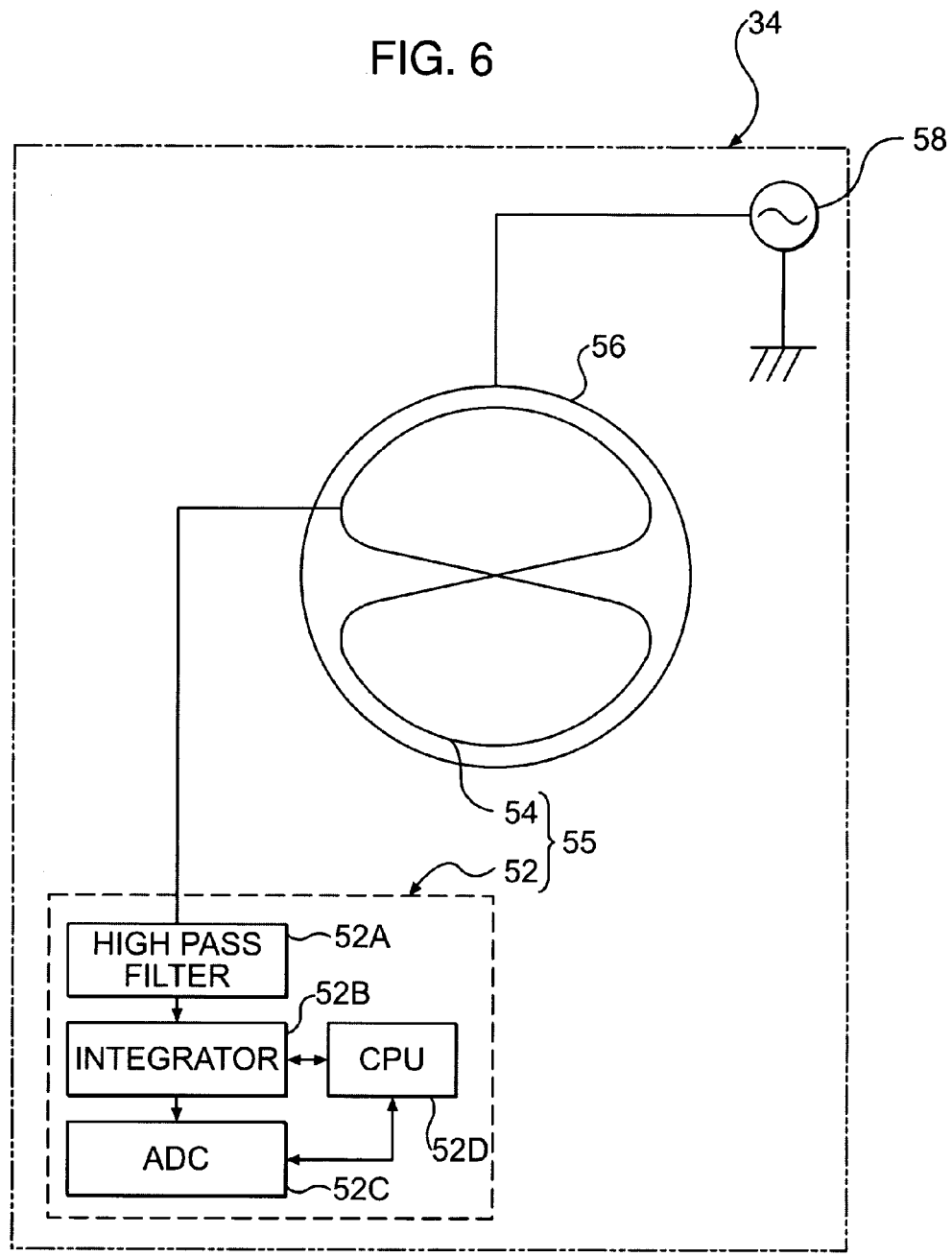

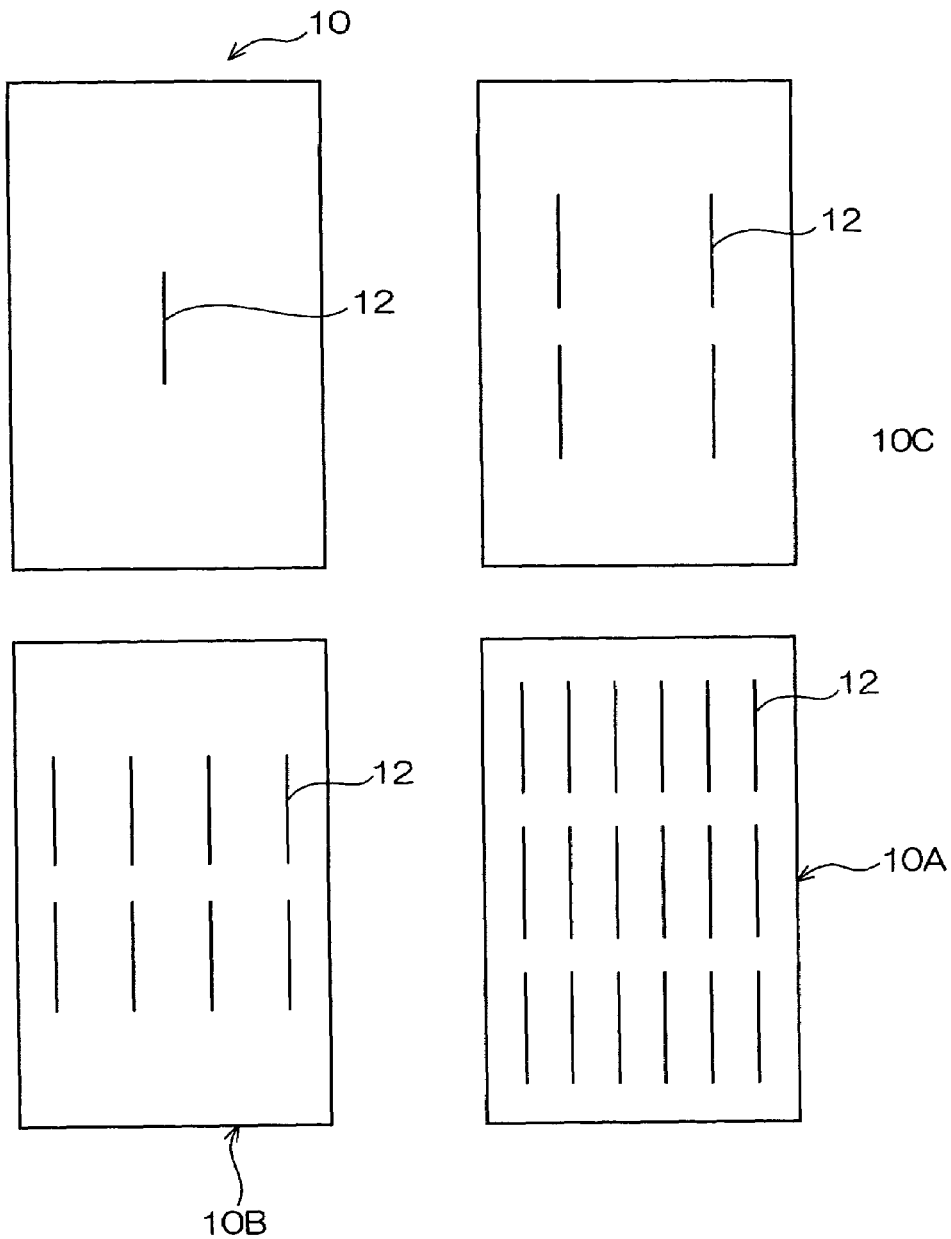

RECORDING MEDIUM DETECTING SYSTEM

CROSS-REFERENCE TO RELATED APPLICATION

This application claims priority under 35 USC 119 from Japanese Patent application No. 2005-373350, the disclosure of which is incorporated by reference herein.

BACKGROUND

1. Technical Field

The present invention relates to a recording medium detecting system.

2. Related Art

Recently, there are more laws and regulations issued for prevention of information leakage, such as those concerning protection of private information, privacy mark, information security, and others. However, it is still difficult to prevent leakage of information such as private information and confidential information printed on paper completely, because printed paper is much easier to bring out and store. Thus, there is an urgent need for a method of preventing leakage of confidential information recorded on recording paper while preserving the convenience in use of the recording paper.

SUMMARY

According to an aspect of the invention, a recording medium detecting system includes a magnetic field-generating unit that generates an alternating magnetic field in a predetermined particular region, a detecting unit provided close to the particular region, that detects a change in magnetic flux density not smaller than a predetermined magnetic-flux-density difference B2, and a recording medium, containing multiple magnetic wires made of a magnetic material and formed in a wire shape having a predetermined length, that causes a large Barkhausen effect when the alternating magnetic field is applied. A magnetic-flux-density difference B1 detected by the detecting unit at an installation position thereof when the recording medium is placed in the particular region is not smaller than the magnetic-flux-density difference B2.

BRIEF DESCRIPTION OF THE DRAWINGS

Embodiments of the present invention will be described in detail based on the following figures, wherein:

FIG. 6 is a schematic view illustrating the electrical configuration of a gate device;

FIG. 8 include schematic views illustrating the recording medium used in Examples and Comparative Examples;

DETAILED DESCRIPTION

The materials for and the layer structure of the recording medium for use in the recording medium detecting system according to the invention and the production process thereof will be described first.

Figure 1:
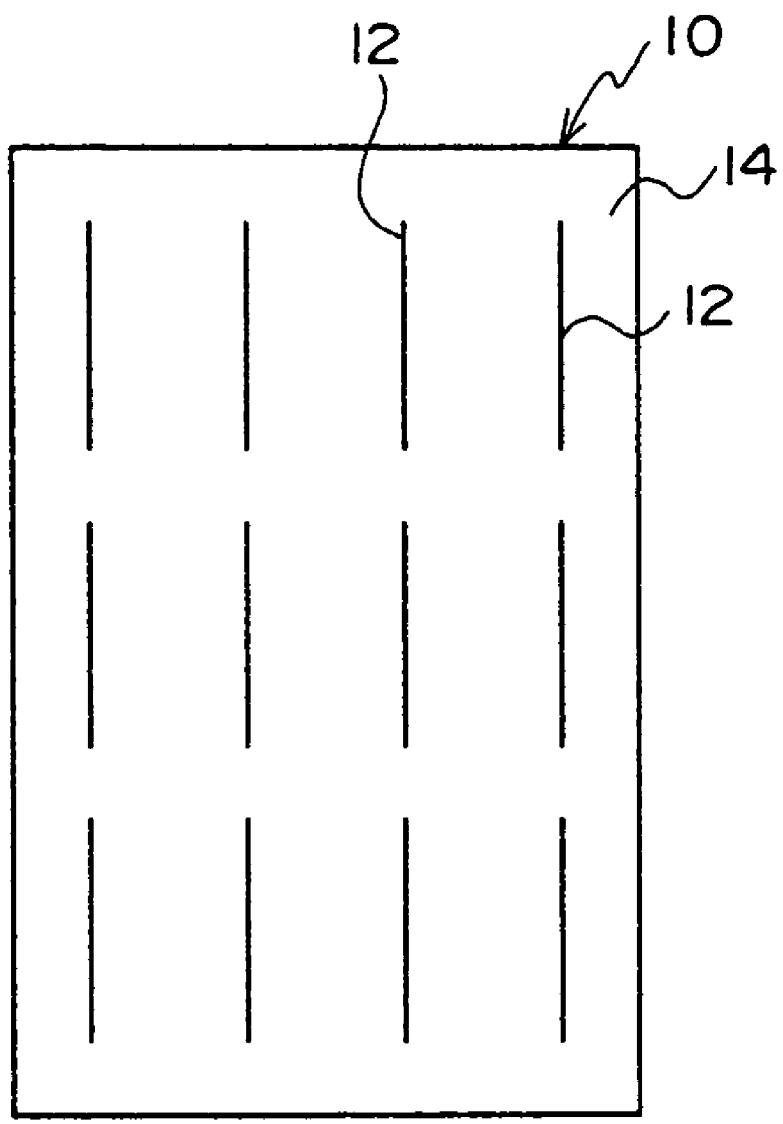
FIG. 1 is a schematic view of an example of the recording medium used in the recording medium detecting system according to the invention.

As shown in FIG. 1, the recording medium 10 for use in the invention contains magnetic wires 12 and a paper substrate 14. The recording medium 10 contains one or more magnetic wires 12.

The recording medium according to the invention is not particularly limited, if it contains a paper substrate 14 and magnetic wires 12, but may contain other various materials as needed. The recording medium 10 for use in the invention may contain only a paper substrate 14 and magnetic wires 12, but may have a coat layer on the surface of the substrate as needed.

Substrate and Coat Layer

The layer structure of the substrate is not particularly limited, and may be a single layer or multiple layers of 2 or more, but preferably a 2- or 3-layered structure practically.

When the substrate has two layers, the magnetic wires 12 are dispersed in the interface region. Alternatively, when the substrate has three layers, the magnetic wires 12 are preferably dispersed in one layer, which is held between other two layers containing no magnetic wire 12. Because the magnetic wires 12 are present close to the surface of the substrate when it is a single layer, it is preferable to form a coat layer to make the magnetic wires 12 present on the surface of the substrate less visible from outside.

A single-layered substrate can be prepared by sheeting raw materials containing a raw paper 14 and magnetic wires 12, and, for example, a paper medium can be prepared by using a pulp slurry containing magnetic wires 12 for the paper substrate 14 and sheeting the slurry according to a common paper-making method. Alternatively, a resin medium can be prepared also by a known resin sheet-forming method, for example, by using a compound prepared by melt-extruding a mixture of a thermoplastic resin and the magnetic wires 12 for paper substrate 14 and injection-molding the compound.

Figure 10A:
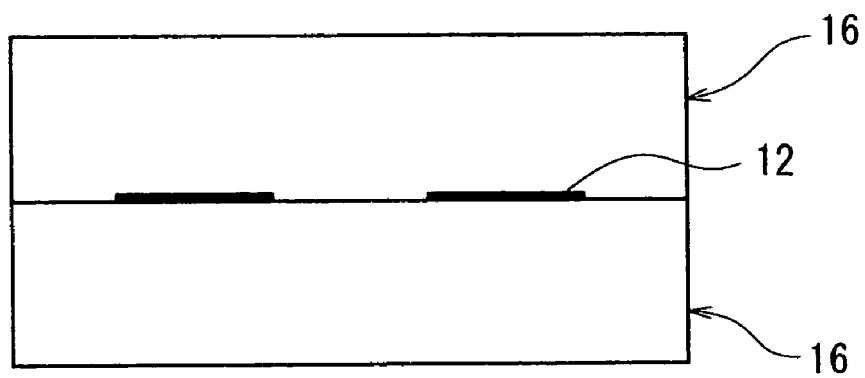
FIG. 10A is a schematic sectional view illustrating a two-layered recording medium.

Yet alternatively, as shown in FIG. 10A, a two-layered substrate can be prepared by placing magnetic wires 12 on one face of a substrate 16 previously prepared and laminating another substrate 16 thereon. During the lamination, an adhesive may be used for adhesion of the substrates, or thermal fusion of the substrates by heat treatment may be used when the paper substrate 14 is made of a thermoplastic resin.

When the magnetic wires 12 are placed at the interface between layers in producing the substrate, the substrate can be prepared in the steps of placing the magnetic wires 12 on one face of the a pulp sheet (wet paper) obtained in the sheeting step and laminating another wet pulp sheet.

Figure 10B:
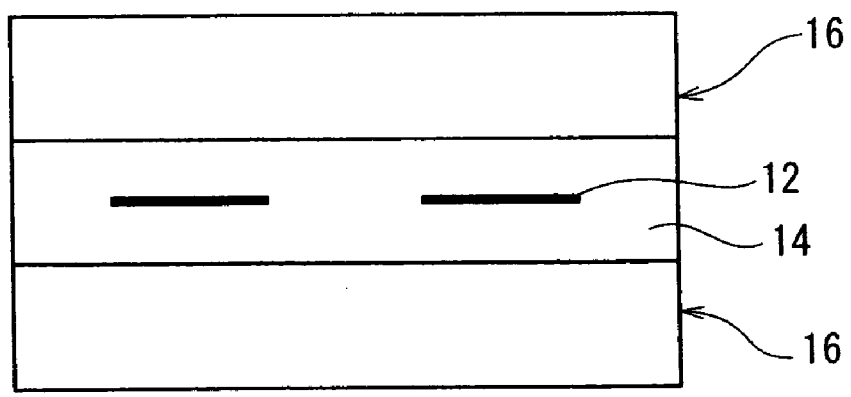
FIG. 10B is a schematic sectional view illustrating a three-layered recording medium.

A three-layered substrate can be prepared, for example, as shown in FIG. 10B, by using the single-layered substrate (or wet paper) containing dispersed magnetic wires 12 described above and two substrates (or wet papers) 16, 16 containing no magnetic wire 12 and laminating the materials as described above.

The coat layer is not particularly limited in its function and material, and an example thereof when an image is formed by the electrophotographic process is an image-receiving layer that is formed for obtaining a glossy image or a silver-salt photograph-like image having a smoothened image surface and smaller in the degree of the surface irregularity due to the toner on image surface. Alternatively, when the substrate has the single-layered structure described above, a coat layer functioning to make the magnetic wires 12 on the surface of the substrate less visible from outside may be formed, and the coat layer may also has another function, for example, as the image-receiving layer described above.

The coat layer is formed by applying a coating solution containing raw materials for the coat layer on a substrate according to a known coating method, by using a size press process, shim size, gate roll coater, roll coater, bar coater, air knife coater, rod blade coater, or blade coater.

Paper Substrate

The paper substrate 14 for use in the recording medium 10 according to the invention, the primary material for the recording medium (substrate) 10, is not particularly limited, if it can be processed into a sheet having a thickness and strength suitable for use in known recording processes such as electrophotographic recording and ink-jet recording. It is, for example, a pulp fiber when the recording medium 10 according to an aspect of the invention is paper, a resin when the recording medium is a resin sheet, and a metal when the recording medium is a metal sheet such as aluminum foil.

Magnetic Wire

The magnetic wire 12 contained in the recording medium 10 for use in the invention is not particularly limited in its composition, if it is made of a magnetic material that has the property causing the large Barkhausen effect and is formed in the wire shape having a particular length.

Figure 2A:
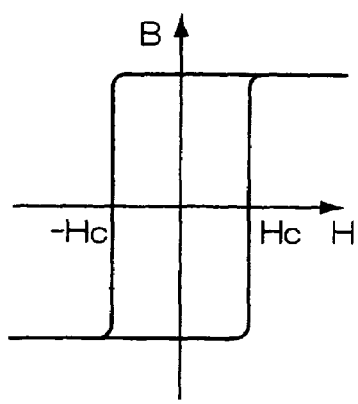
FIGS. 2A, 2B, and 2C are explanatory drawings showing a large Barkhausen effect.

Hereinafter, the large Barkhausen effect will be described briefly. FIG. 2 shows charts for description of the large Barkhausen effect. The large Barkhausen effect is a phenomenon of the drastic magnetic flux reversal that occurs when a material having B-H characteristics, i.e., having an almost rectangular hysteresis loop shown in FIG. 2A and a relatively smaller coercive force (Hc) is placed in an alternating magnetic field.

The composition of the magnetic material for magnetic wires 12 is, for example, an alloy of magnetic elements such as Co—Fe—Ni, a transition metal, a glass-forming element such as Si, B, C, or P; and the magnetic material is, for example, an amorphous magnetic material of Co—Fe—Ni—B—Si. Various materials having various magnetic characteristics that are different in composition of the constituent elements and preparative method can be used as the magnetic materials for use in the magnetic wire 12 according to an aspect of the invention. The hue of the amorphous alloy containing the elements above is not so dependent on the composition of the elements.

The shape of the magnetic wire 12 is not particularly limited, if it is suitable for generating the large Barkhausen effect, but a certain length/sectional area ratio is needed for generating the large Barkhausen effect, and thus, the shape is preferably wire or belt, more preferably wire.

The magnetic wires 12 may be used as they are dispersed in the recording medium 10, but are preferably covered with an insulation layer (hereinafter, referred to as "insulation layer"), to prevent inhibition of the large Barkhausen effect of the magnetic material dispersed in the recording medium 10.

The material for the insulation layer is not particularly limited, if it is a known insulating material such as resin or glass can be used. When a resin is used as the insulating material, the resin is preferably a heat-resistant polyimide resin.

The method of forming the insulation layer is not particularly limited, and is selected properly, according to the material used for forming the insulation layer, from known thin film-forming methods including gas-phase deposition methods such as sputtering, CVD (chemical vapor deposition), and vacuum deposition, liquid-phase coating methods such as dip coating, roller coating, spray coating, and coating by using a sol-gel process; but gas-phase deposition methods are preferably for forming a uniform and thinner insulation layer. The insulation layer may be formed almost simultaneously with conversion of the magnetic material into wire, and for example, an insulation layer may be formed on the wire of a magnetic material immediately after preparation from the molten state by a gas-phase deposition method such as CVD while the magnetic wire 12 is cooled.

Paper Medium

Hereinafter, a case when the recording medium 10 according to an aspect of the invention is a paper medium will be described in more detail. When the recording medium 10 according to an aspect of the invention is a paper medium, the recording medium can be prepared by using a material and a process fundamentally the same as those for known paper media, except that the magnetic wires are contained and a substrate having a multi-layer structure of two or three layers is used as needed as described above.

The thickness of the recording medium 10 in such a case is preferably in the range of 60 to 110 μ, more preferably in the range of 60 to 80 μm, similarly to normal paper media.

The substrate for use in the invention contains at least pulp fiber as the primary raw material, and may be a substrate described below or a plain paper having the substrate surface-treated with a pigment or a binder.

The substrate contains pulp fiber; any one of known pulp fibers may be used; and typical examples thereof include chemical pulps such as bleached hardwood Kraft pulp, unbleached hardwood Kraft pulp, bleached softwood Kraft pulp, unbleached softwood Kraft pulp, bleached hardwood sulfite pulp, unbleached hardwood sulfite pulp, bleached softwood sulfite pulp, and unbleached softwood sulfite pulp; pulps prepared by chemical processing of fibrous materials such as wood, cotton, hemp, bast; and other fibrous materials.

In addition, ground wood pulps prepared by mechanically pulping woods and chips, chemimechanical pulps prepared by mechanically pulping chemical-impregnated woods and chips, thermomechanical pulps prepared by pulping the chips slightly softened by previous steaming in a refiner, and the like may also be used. These pulps may be prepared from virgin pulps or combined with waste paper pulps if desired.

In particular, if a virgin pulp is used, the virgin pulp is preferably bleached by the method of using only chlorine dioxide but not chlorine gas (Elementally Chlorine Free: ECF) or by the method of using ozone/hydrogen peroxide or the like but not a chlorine compound (Total Chlorine Free: TCF).

Raw materials for the waste paper pulps include unprinted waste papers of extremely high-quality, high-quality, medium-grade white, low-grade, and other white papers that are cut, damaged, and irregular in size generated in bookmakers, printshops, cutting facilities, and the like; high-quality waste papers such as woodfree and coated woodfree papers that are printed or copied; waste papers printed with inks such as aqueous and oil-based inks or with lead pencils; newspaper waste papers containing advertising leaflets of printed woodfree papers, woodfree coated paper, wood-containing paper, or wood-containing coated paper; and waste papers of wood-containing papers, coated wood-containing papers, wood papers, and the like.

The substrate for use in the invention is preferably the pulp of raw waste papers bleached at least either by an ozone or hydrogen peroxide bleaching treatment. For obtaining a recording paper higher in whiteness, it is preferable to make the blending ratio of the waste papers obtained by the bleaching treatment above in the range of 50 to 100% by mass. Further from the viewpoint of resource recycling, the blending ratio of the waste paper pulps above is preferably in the range of 70 to 100% by mass.

The ozone treatment decomposes fluorescent dyes and the like that are commonly contained in woodfree papers, while the hydrogen peroxide bleaching treatment prevents yellowing caused by the alkalis used in the deinking process. In particular, combined use of these two treatments allows easier deinking of waste papers and improves the whiteness of the pulps obtained at the same time. In addition, the treatment also decomposes and eliminates the chlorine compounds remaining in the pulps and thus is very effective in reducing the content of organic halogen compounds in the waste papers that are bleached with chlorine.

In addition to pulp fibers, a filler may be added to the base paper, for adjustment of the opacity, whiteness, and surface smoothness thereof. It is preferable to use a non-halogen filler particularly, if reduction in the halogen content of recording papers is desirable.

Examples of the usable fillers include white inorganic pigments such as heavy calcium carbonate, light calcium carbonate, chalk, kaolin, calcined clay, talc, calcium sulfate, barium sulfate, titanium dioxide, zinc oxide, zinc sulfide, zinc carbonate, aluminum silicate, calcium silicate, magnesium silicate, synthetic silica, aluminum hydroxide, alumina, sericite, white carbon, saponite, calcium monmorillonite, sodium monmorillonite, and bentonite; and organic pigments such as acrylic plastic pigments, polyethylene, and urea resins. If waste paper pulps are blended to the base paper, the blending amount of the waste paper pulps should be adjusted by previously estimating the ashes contained in the raw waste-paper pulps.

In addition, an internal sizing agent is preferably added to the substrate for use in the invention. Examples of the internal sizing agents include those used in neutral sheeting processes such as neutral rosin-based sizing agents, alkenyl-succinic anhydrides (ASA), alkylketene dimers (AKD), and petroleum resin-based sizing agents.

When the surface of substrate is desirably modified to be cationic, a hydrophilic cation resin or the like may be used as the cationic substance for processing the surface, and the sizing degree of the paper before application of the cationic resin is preferably 10 seconds or more and less than 60 seconds for suppression of penetration of this cationic resin into the paper.

In addition, a paper-strength improver may be added internally or externally to the base material as needed. Examples of the paper-strength improvers include starch, modified starches, vegetable gums, carboxymethylcellulose, polyvinylalcohol, polyacrylamide, urea-formaldehyde resins, melamine-formaldehyde resins, dialdehyde starch, polyethyleneimine, epoxidized polyamides, polyamide-epichlorohydrin resins, methylol-modified polyamides, chitosan derivatives, and the like: and these materials may be used alone or in combination.

In addition, various additive commonly used in paper media such as dye and pH adjuster may be used as needed.

It is possible to prepare the substrate for use in the invention by spreading the magnetic material at the interface of layers or dispersing it in the layer as described above, after the step of preparing such a substrate or after drying the pulp sheet obtained after sheeting.

The substrate obtained may be finished with a surface-sizing solution, and a coat layer may be formed thereon as needed. The surface treatment may be carried out by coating a surface sizing solution by using a coating unit commonly used in the art such as size press, shim size, gate roll, roll coater, bar coater, air knife coater, rod blade coater, or blade coater.

In addition, a coat layer containing a pigment and an adhesive as principal materials may be formed on the substrate, for providing the recording medium according to an aspect of the invention with a texture similar to that of conventional coat papers and also for making the magnetic material less visible from outside by the fourth camouflaging method.

Examples of the pigments for use in the coat layer include common pigments used on general coated paper such as mineral pigments including heavy calcium carbonate, light calcium carbonate, titanium dioxide, aluminum hydroxide, satin white, talc, calcium sulfate, barium sulfate, zinc oxide, magnesium oxide, magnesium carbonate, amorphous silica, colloidal silica, white carbon, kaolin, sintered kaolin, delaminated clay, aluminosilicate salts, sericite, bentonite, smectite and the like, and organic pigments such as polystyrene resin fine particles, urea formaldehyde resin fine particles, and fine hollow particles; and these pigments may be used alone or in combination of two or more.

The adhesive for use in the coat layer is, for example, an synthetic or natural adhesive.

Examples of the synthetic adhesives include those of a copolymer such as styrene-butadiene, styrene-acrylic, ethylene-vinyl acetate, butadiene-methyl methacrylate, or vinyl acetate-butyl acrylate; polyvinylalcohol, a maleic anhydride copolymer, an acrylic acid-methyl methacrylate copolymer, and the like. One or more of these synthetic adhesives may be used according to applications. The adhesive is preferably used in an amount in the range of 5 to 50 mass %, more preferably of approximately 10 to 30 mass %, with respect to 100 mass % of the pigment.

Examples of the natural adhesives include commonly known adhesives such as oxidized starches, esterified starches, enzyme-modified starches, cold water-soluble starches obtained by flash drying thereof, casein, soy bean protein, and the like. The adhesive is also used in an amount in the range of 0.1 to 50 mass %, more preferably of approximately 2 to 30 mass %, with respect to 100 mass % of the pigment.

In addition, various additives commonly blended into pigments for coated paper, such as dispersant, thickener, moisturizer, antifoam, and water repellent, may be used as needed.

The coating composition thus prepared containing the components described above is coated on-machine or off-machine in a coating machine commonly used in preparation of the coated paper, such as blade coater, air knife coater, roll coater, reverse roll coater, bar coater, curtain coater, die slot coater, or gravure coater, on a substrate into a single- or multi-layered structure. The coating amount is normally, approximately 5 to 15 g/m² per face as dry weight, but may be higher than the range above, to make the magnetic material less visible from outside in the present invention.

Smoothing of the coated film is preferably performed in a smoothing machine commonly used, for example by super calendering, machine calendering, or soft nip calendering, and the coated paper is preferably finished to have a white-paper glossiness of 30% or more.

Figure 3:
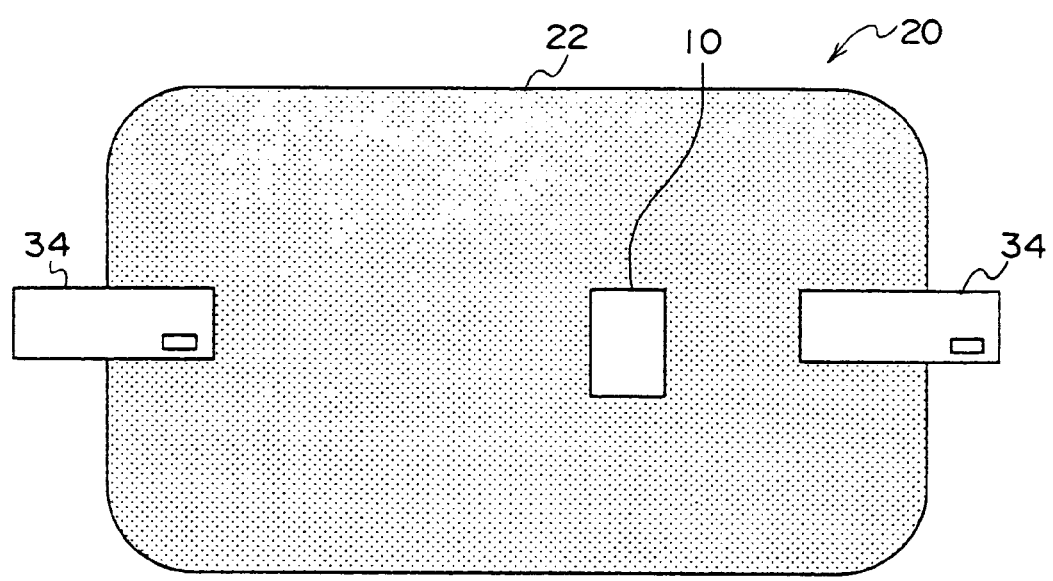
FIG. 3 is a schematic view illustrating the configuration of a recording medium detecting system according to the invention.

As shown in FIG. 3, the recording medium detecting system 20 according to the invention contains the recording medium 10 for use in a predetermined restricted area 22 and gate devices 34 preventing displacement of the recording medium 10 out of the restricted area 22.

The gate devices 34 are formed at the inlet and outlet ports of the restricted area 22.

Figure 4:
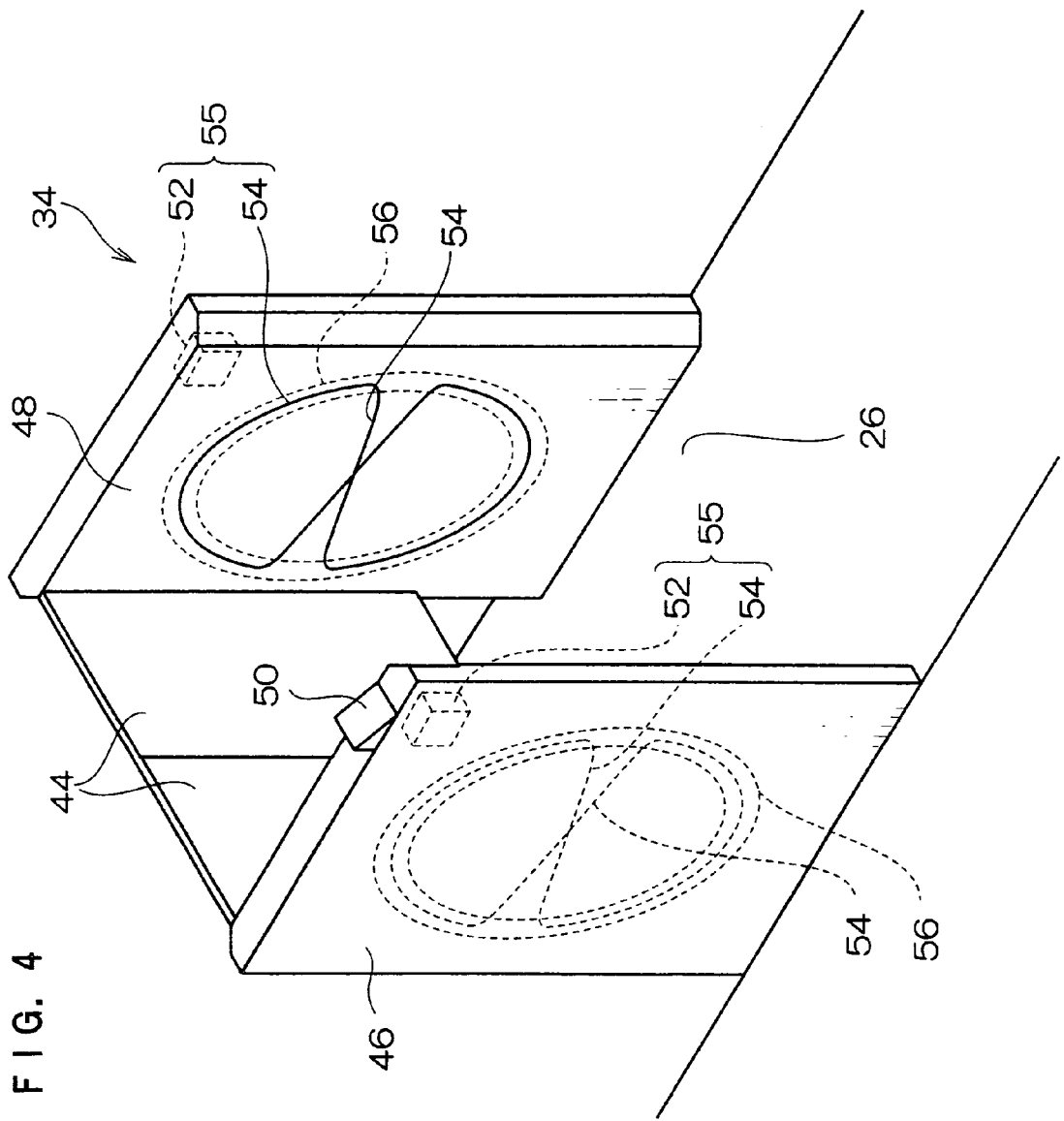
FIG. 4 is a schematic view illustrating a gate device.
Figure 5:
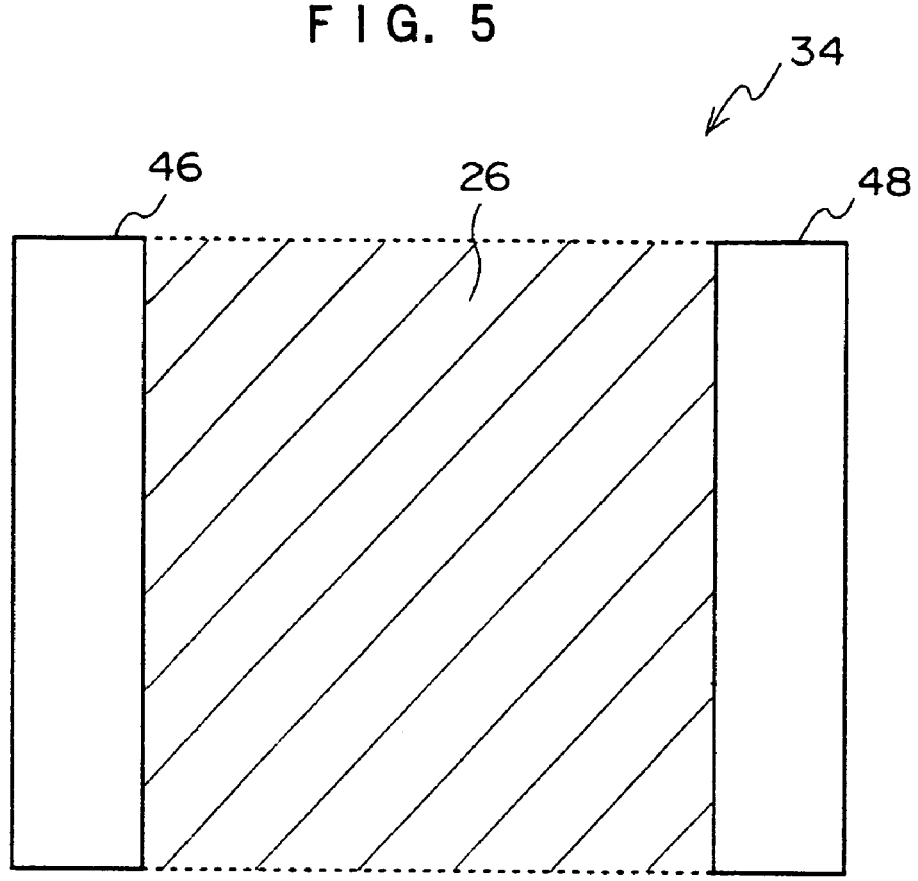
FIG. 5 is a schematic view illustrating a gate device.

As shown in FIGS. 4 and 5, the respective gate devices 34 are formed at the inlet and outlet ports of the restricted area 22 respectively with two gate pillars 46 and 48. There are formed hinged double doors 44 that open and close between the gate pillars 46 and 48.

In this manner, the gate device 34 with the hinged double doors 44 formed between the gate pillars 46 and 48 is configured to prevent movement of the user carrying a recording medium 10 through the inlet or outlet port of the restricted area 22.

As shown in FIGS. 4 and 6, the gate device 34 contains excitation coils 56 as a magnetic field-generating unit of generating an alternating magnetic field in the region between the gate pillars 46 and 48 mutually facing each other (hereinafter, referred to as particular region) 26 and a detecting device 55 as a detecting unit of detecting a change in magnetic flux density that is not lower than the predetermined magnetic-flux-density difference B2 in the region close to the particular region 26.

Although described here in this exemplary embodiment is a case where excitation coils 56 and detecting devices 55 are formed respectively in the gate pillars 46 and 48, the excitation coils 56 are only needed to be located in the area where it is possible to generate an alternating magnetic field in the particular region 26 and thus may not be formed in the gate pillars 46 and 48.

There is also an alarm 50 installed in one of the gate pillars 46 and 48 for alarming, for example, with sound such as warning buzzer or light.

The excitation coil 56 is electrically connected to a power source 58 for supplying alternate current to the excitation coil 56, and it is possible to generate an alternating magnetic field in the particular region 26, for example, by applying an AC voltage of 1 kHz to the excitation coil 56.

The detecting device 55 has detecting coils 54 corresponding to the pulse detecting unit of the recording medium detecting system according to the invention and detecting units 52 corresponding to the magnetic-flux-density-difference detecting unit of the recording medium detecting system according to the invention. The detecting coil 54 is signal-communicatively connected to the detecting unit 52.

Although a case where excitation coils 56 and detecting devices 55 are formed respectively in the gate pillars 46 and 48 is described in this exemplary embodiment, the excitation coils 56 are only needed to be installed in the area where it is possible to generate an alternating magnetic field in the particular region 26, and thus may not be formed in the gate pillars 46 and 48. Similarly, the detecting device 55 should have the detecting coils 54 contained in the detecting device 55 described below only in the region close to the particular region 26; and thus, devices other than the detecting coils 54 contained in detecting device 55 may not be formed in the gate pillars 46 and 48 if they are close to the particular region 26.

The detecting coils 54 detect fluctuation in magnetic field in the particular region 26. Specifically, when the recording medium 10 is placed in the particular region 26, the detecting coils 54 detect the flux reversal pulse due to magnetization of the magnetic material in each of the multiple magnetic wires 12 contained in the recording medium 10.

The detecting unit 52 detects the change in magnetic flux density, when the magnetic-flux-density difference detected by the detecting coil 54, i.e., the sum of the currents caused by the flux reversal pulses generated by magnetization of the magnetic materials in the multiple magnetic wires 12 contained in the recording medium 10, is not lower than the predetermined magnetic-flux-density difference B2.

When an alternating magnetic field is generated in the particular region 26 by applying an alternate current from the power source 58 to the excitation coil 56 and a recording medium 10 is placed in the alternating magnetic field, the flux reversal of the magnetic material in the magnetic wires 12 contained in the recording medium 10 is generated, as shown in FIG. 2(a), causing a change in magnetic flux density; and a pulse current flows in the detecting coil 54 at an intensity (current) corresponding to the change in magnetic flux.

Figure 2B:
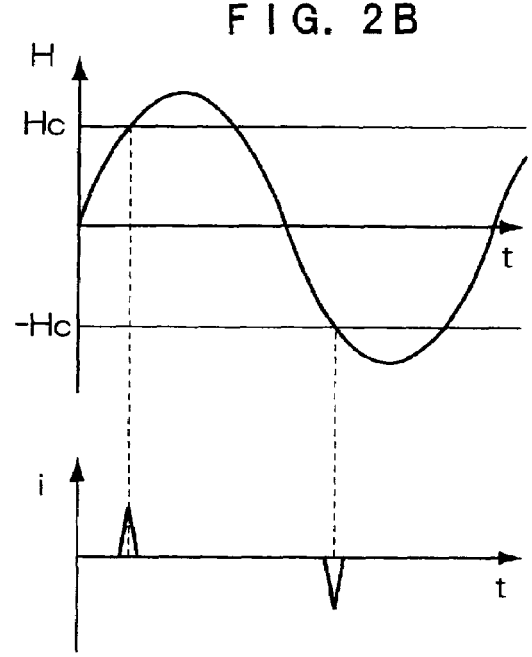

For example, when an alternating magnetic field shown in the top chart of FIG. 2B is generated by the excitation coils 56 in the particular region 26, pulse currents like the flux reversal pulses shown in the bottom chart of FIG. 2B flow in the detecting coil 54, as induced by the large Barkhausen effect of the magnetic wire 12 in the recording medium 10.

However, because the alternate current derived from the alternating magnetic field is also included in the current flowing in the detecting coil 54, the pulse currents are detected as they are superimposed on the alternate current. For that reason, each detecting coil 54 is formed in the figure of "8", for detecting only the change in magnetic flux density caused by the flux reversal of the magnetic material for each of the multiple magnetic wires 12 contained in the recording medium 10.

Figure 2C:
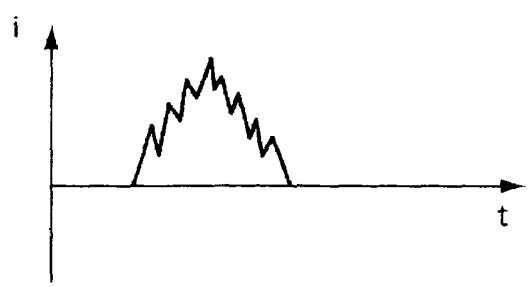

If multiple magnetic wires 12 are contained in the recording medium 10 as in the recording medium 10 for use in the invention, when a recording medium 10 is placed in the particular region 26 (i.e., in an alternating magnetic field), a current superimposed with multiple pulse currents shown in FIG. 2C is detected by the detecting coil 54.

Thus, the magnetic-flux-density difference of the recording medium 10 including the multiple magnetic wires 12 detected by the detecting device 55 is the integral value of the multiple pulse currents detected when the recording medium 10 is placed in the particular region 26.

Thus, the magnetic-flux-density difference B1 obtained based on the flux reversal pulses detected by the detecting coil 54 when the recording medium 10 is placed in the particular region 26 is an integral value of the pulse currents flowing in the detecting coil 54 during the period of the excitation magnetic field starting from zero to the peak value and then back to zero when the recording medium 10 is brought into and out of the particular region 26.

The detecting unit 52 has a high pass filter (hereinafter, referred to as HPF) 52A, an integrator 52B, an ADC 52C, and a CPU 52D.

The pulse currents detected by the detecting coil 54 reach the integrator 52B via the HPF 52A and are integrated in the integrator 52B, and the resulting signal is outputted via the ADC 52C as a digital signal to the CPU 52D.

The HPF 52A removes the current induced by the alternating magnetic field, for example the alternate current components by the power source 58 applied to the excitation coil 56, from the pulse currents outputted from the detecting coil 54, and allows transmission only of the pulse current at a strength corresponding to the flux reversal of the magnetic material for the magnetic wires 12 contained in the recording medium 10.

By integrating the pulse current passing through the HPF 52A, the integrator 52B outputs the magnetic-flux-density difference, i.e., the integral value of the multiple pulse currents flowing in the recording medium 10 that are detected when the recording medium 10 is placed in the particular region 26, to the ADC 52C as an analog signal indicating the magnetic-flux-density difference of the recording medium 10 including the multiple magnetic wires 12 detected by the detecting device 55.

The timing of integration is controlled by the CPU 52D, and the integration is performed for each recording medium 10.

The ADC 52C is a transducer converting analog signal to digital signal, and outputs the analog signal indicating the magnetic-flux-density difference integrated by the integrator 52B as a digital signal to the CPU 52D.

If the CPU 52D judges that a recording medium 10 is placed in the particular region 26 when a signal is inputted from the ADC 52C, it may erroneously judge that a recording medium 10 is placed in the particular region 26, independently on how large the signal indicating the magnetic-flux-density difference inputted to the CPU 52D, when a medium other than the recording medium 10 or another magnetic material is placed in the particular region 26 or when the recording medium 10 is place outside the particular region 26. Thus, the CPU 52D has the magnetic-flux-density difference B2 previously set as the threshold value for judgment of whether a recording medium 10 is placed in the particular region 26.

Accordingly this exemplary embodiment, the CPU 52D judges that a recording medium 10 is placed in the particular region 26, when a signal indicating a magnetic-flux-density change at an intensity not smaller than the threshold value, i.e., the magnetic-flux-density difference B2, is inputted from the ADC 52C.

Figure 7A:
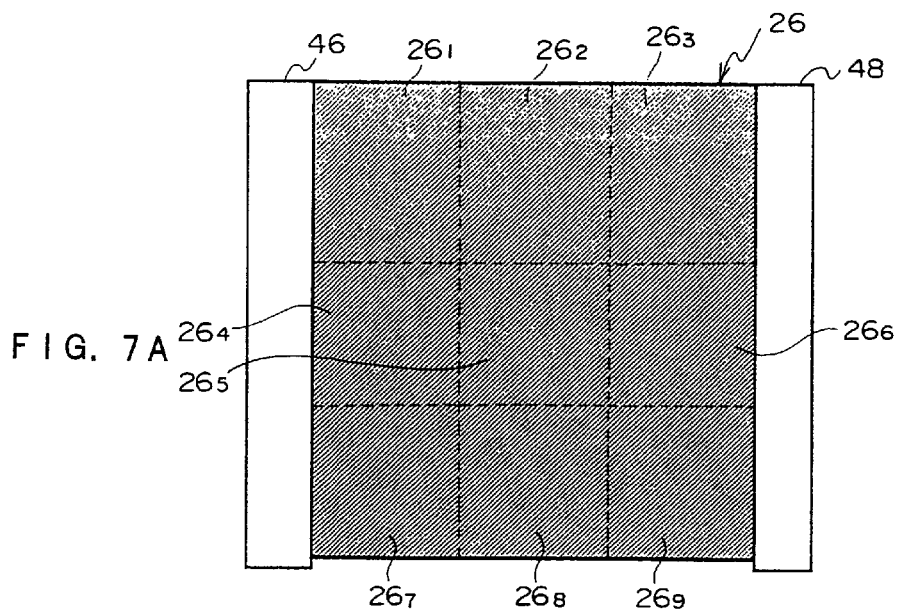
FIG. 7A is a schematic view illustrating the region in the particular region of Example 1 where the magnetic-flux-density difference B1 is not lower than the magnetic-flux-density difference B2.

Thus, if the detecting device 55 judges that a recording medium 10 is placed in the particular region 26 when a magnetic-flux-density change of not less than the magnetic-flux-density difference B2 is detected, as shown in FIG. 7A, it is difficult to judge that a recording medium 10 is placed in the particular region 26, if the recording medium 10 does not contain the magnetic wires 12 allowing detection of a change in magnetic flux density of not less than the magnetic-flux-density difference B2, even when the recording medium 10 is placed in any one of the multiple regions $26_1$ to $26_n$ divided in the particular region 26.

However, even when the same recording medium 10 is placed in the particular region 26, the magnetic-flux-density difference detected by the detecting device 55 becomes smaller when the recording medium 10 is placed in the region separated from the installation position of detecting coil 54, than when the recording medium 10 placed in the region close to the installation position of detecting coil 54.

Thus, there is a concern about generation of the phenomenon that, even when the same recording medium 10 is placed in the particular region 26, the detecting device 55 detects the recording medium 10 if the recording medium 10 is placed in the region 62 close to the installation position of detecting coil 54, while the detecting device 55 does not detect the recording medium 10 if the recording medium 10 is placed in the region 60 separated from the installation position of detecting coil 54, as shown in FIG. 7.

For that reason in the invention, specified is one of the amount, diameter, and length of the magnetic wires 12 contained in the recording medium 10 for use in the recording medium detecting system 20 according to the invention, to make the magnetic-flux-density difference B1, which is determined by the detecting unit 52 based on the flux reversal pulses detected by the detecting coil 54 at the installation position, when the recording medium 10 is placed in the particular region 26 position, not less than the previously-determined magnetic-flux-density change B2, i.e., the threshold value for detection of the recording medium 10.

For improvement in detection accuracy of the recording medium 10 by detecting device 55 and preservation of the detection accuracy even in change of installation environment, the magnetic-flux-density difference B1 is particularly preferably twice or more larger than the magnetic-flux-density difference B2, threshold value for detection of the recording medium 10 by detecting device 55.

When a recording medium 10 is placed in the particular region 26, the magnetic-flux-density difference detected by the detecting device 55 become larger, as the number of the magnetic wires 12 contained in the recording medium 10 increases, or as the cross-sectional diameter or the length of each magnetic wire 12 increases.

Thus, it is preferably to specify at least one of the amount, diameter, and length of the magnetic wires 12 contained in the recording medium 10, to make the detecting system satisfy the relationship above.

The diameter of the magnetic wires 12 should be lower than the thickness of the recording medium 10, for dispersion of the magnetic wires 12 in the recording medium 10, for prevention of exposure of the magnetic wires 12 on the surface or in the regions close to the surface of the recording medium 10, and also from the viewpoint of productivity. Generally, the thickness of the recording medium 10 is 60 µm to 200 µm, and the diameter should be not larger than the thickness.

For example, the diameter is preferably 80 µm or less, more preferably 50 µm or less, for use in the recording medium 10 having a thickness of approximately 90 µm. When the diameter of the magnetic wires 12 is specified in this manner, it is preferable to adjust one or both of the amount and length of the magnetic wires 12 contained in the recording medium 10, to make the detecting system satisfy the relationship above.

In addition, the length of the magnetic wire 12 is preferably 100 times or more, more preferably 500 times or more, and still more preferably, 1,000 times or more, larger than the diameter of the magnetic wire 12.

A ratio of the length of the magnetic wire 12 to the diameter of the magnetic wire 12 at less than 100 may lead to decrease in the magnetization intensity of the wire itself in the length direction, causing a problem of greater susceptibility to demagnetizing field. However, when the ratio of the length of the magnetic wire 12 to the diameter of the magnetic wires 12 is 100 or more, it is possible to reduce the influence of the demagnetizing field and make the most of the large Barkhausen effect of the magnetic wire 12.

Hereinafter, the function of the gate device 34 will be described.

In the exemplary embodiment, it is assumed that the CPU 52D is connected signal-communicatively to various devices installed in the gate device 34 including an alarm 50 and a driving unit not shown in the Figure for opening and shutting the hinged double doors 44 formed in the gate device 34 and controls the gate device 34; but a control unit for controlling the gate device 34 may be formed separately in the gate device 34. In such a case, the control unit is connected signal-communicatively to the CPU 52D, alarm 50, and other units including the driving unit.

In such a configuration, when a user carrying the recording medium 10 according to the invention passes through a particular region 26 of gate device 34 and goes out of the restricted area 22, a signal having the magnetic-flux-density difference B1 is inputted via the detecting coil 54 of gate device 34 to the CPU 52D of gate device 34.

The CPU 52D judges whether the inputted magnetic-flux-density difference B1 is not less than the predetermined magnetic-flux-density difference B2, and, when the magnetic-flux-density difference B1 is not less than the magnetic-flux-density difference B2, control the driving unit not shown in the Figure to close the hinged double doors 44, or to open the hinged double doors 44 when the magnetic-flux-density difference B1 is less than the magnetic-flux-density difference B2.

It is thus possible to prohibit the user from passing through the gate device 34 and displacement of the recording medium 10 according to the invention to the area outside the restricted area 22, when the user carrying the recording medium according to the invention 10 passes through the particular region 26 of the gate device 34 and goes out of the restricted area 22.

Additionally, the CPU 52D orders the alarm 50 to beep, when the magnetic-flux-density difference B1 is not smaller than the magnetic-flux-density difference B2. It is thus possible to warn the people around the gate device 34 that someone is bringing recording medium according to the invention 10 out of the restricted area 22.

As described above, with the recording medium detecting system 20 according to an aspect of the invention, it is possible to detect a recording medium 10 accurately, even when the recording medium 10 in placed in any one of the multiple divided regions divided in the particular region 26, because at least one of the amount, diameter, and length of the magnetic wires 12 contained in the recording medium 10 is so specified that the magnetic-flux-density difference B1 determined in the detecting unit 52 based on the flux reversal pulses detected at the installation position of detecting coil 54 when the recording medium 10 is placed in the particular region 26 of the recording medium detecting system 20 becomes not smaller than the magnetic-flux-density difference B2, the threshold value for detection of the recording medium 10.

In the exemplary embodiment, a case where at least one of the amount, diameter, and length of the magnetic wires 12 contained in the recording medium 10 is so specified that the magnetic-flux-density difference B1 determined in the detecting unit 52 based on the flux reversal pulses detected at the installation position of detecting coil 54 when the recording medium 10 is placed in the particular region 26 of the recording medium detecting system 20 becomes not smaller than the magnetic-flux-density difference B2, threshold value for detection of the recording medium 10 was described, but at least one of the following factors: the winding number of the detecting coil 54, the size of the detecting coil 54, and the intensity of the alternating magnetic field generated by the excitation coil 56, may be so specified additionally to make the detection system satisfy the condition above.

EXAMPLE

Hereinafter, the recording medium detecting system 20 according to the present invention will be described in detail with reference to Examples, but it should be understood that the invention is not limited to these Examples.

Example 1

Magnetic Wire

A magnetic amorphous iron cobalt wire (Hc=70A/m or less) having a length of 25 mm and a diameter of approximately 30 μm is made available as the magnetic wire.

Then, an insulating layer having a thickness of approximately 3 to 5 μm is formed on the magnetic wire according to the method below, to give a coated magnetic wire.

Formation of Insulating Layer

The insulating layer is prepared by extruding the magnetic amorphous iron-cobalt material in the molten state into wire and immediately allowing the magnetic wire to pass through a tightly sealed chamber, where a silica film is formed thereon by CVD.

Preparation of Recording Medium

To a pulp slurry having a freeness of 420 ml obtained by beating 100 parts by mass of a pulp slurry of broadleaf bleached Kraft pulp (LBKP) in a Niagara beating machine (manufactured by Kumagai Riki Kogyo), added are 15 parts by mass of light calcium carbonate (Tamapearl TP-121, manufactured by Okutama Kogyo Co., Ltd.), 0.1 parts by mass of aluminum sulfate, 0.8 parts by mass of a cationized starch (trade name: MS4600 manufactured by Nihon Shokuhin Kagaku Kogyo Co., Ltd.), and 0.3 parts by mass of an alkenylsuccinic anhydride (Fiblan 81, manufactured by National Starch & Chemical Japan Co., Ltd.) respectively with respect to 100 parts by mass of the pulp fiber solid matter; and the mixture thereof is diluted with white water, to give a pulp slurry having a solid matter concentration of 0.3 mass %.

After stirred for 2 hours, the pulp slurry is sheeted in Oriented Sheet Former (manufactured by Kumagai Riki Kogyo) under a jet pressure of 1.5 kg/cm² and a drum rotational velocity of 700 m/min; and two A4-sized sheets are cut off from the resulting wet paper, and one sheet is piled on the other. Before piling, 18 coated magnetic wires having a length of 25 mm described above are spread uniformly over an area of A4 on the adhesive face of one wet paper (see recording medium 10A in FIG. 8).

Subsequently, the composite of two wet papers is pressed at a pressure of 10 kg/cm² for 3 minutes by using a square sheet machine press 2570 (manufactured by Kumagai Riki Kogyo).

Then, an oxidized starch (Ace B, manufactured by Oji Cornstarch Co., Ltd.) is coated on the wet paper to a coating amount of 2.5 g/m² as dry weight in the size pressing machine, and after drying, the resulting sheet is surface-treated by machine calendering to an Oken-type smoothness of 30 seconds, to give a substrate having a basis weight of approximately 52 g/m², which is used as the recording medium of Example 1.

Comparative Example 1

A recording medium is prepared in a similar manner to Example 1, except that magnetic wires having a length of 25 mm, the same magnetic wires used in Example 1, are spread in an amount of 8 pieces over an area of A4 on the adhesive surface of one wet paper (see recording medium 10B in FIG. 8).

Comparative Example 2

A recording medium is prepared in a similar manner to Example 1, except that magnetic wires having a length of 25 mm, the same magnetic wires used in Example 1, are spread in an amount of 4 pieces over an area of A4 on the adhesive surface of one wet paper (see recording medium 10C in FIG. 8).

Comparative Example 3

A recording medium is prepared in a similar manner to Example 1, except that magnetic wires having a length of 25 mm, the same magnetic wires in Example 1, are spread in an amount of 1 piece over an area of A4 on the adhesive surface of one wet paper (see recording medium 10D in FIG. 8).

The distance between the detecting coil 54 installed in gate pillar 46 and the detecting coil 54 installed in gate pillar 48 is 90 cm, and each detecting coil 54 is installed in the gate pillar 46 or 48, in the shape of two ellipses having a diameter of 30 cm, parallelogram, or two circles in the figure of "8".

In addition, an alternate current at approximately 1 kHz and 2 to 3 V is applied to the excitation coil 56, to make the magnetic-flux-density difference B2 become 1 V or more (after passage through 133-dB amplifier).

Each of the recording medium prepared in Example 1 and Comparative Examples 1 to 3 as described above is allowed to pass through each of the divided regions in the particular region 26 (approximately 100 regions in the particular region 26 divided along the direction of the gate pillars 46 and 48 facing each other and along the direction perpendicular to the direction of the gate pillars 46 and 48 facing each other), while the substrate face of the recording medium held in the direction identical with the direction of the gate pillars 46 and 48 facing each other and transferred in the direction perpendicular to the direction of the gate pillars 46 and 48 facing each other.

The recording medium prepared in Example 1 is detected by the gate device 34, when it passes through any divided region in the particular region 26 (see FIG. 7A).

Figure 7B:
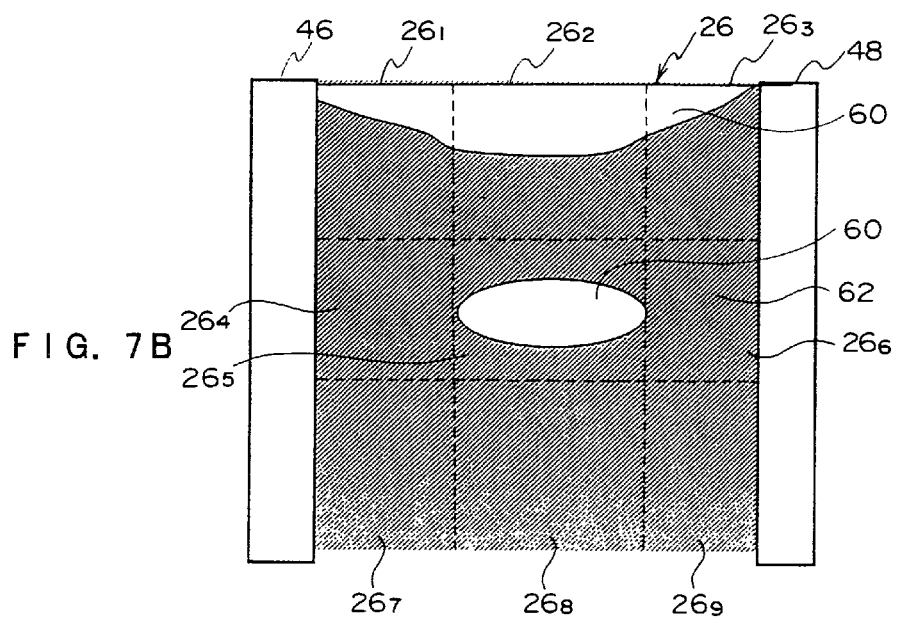
FIG. 7B is a schematic view illustrating the region in the particular region of Comparative Example 1 where the magnetic-flux-density change B1 is not lower than the magnetic-flux-density difference B2 and the region where the magnetic-flux-density change amount B1 is lower than magnetic-flux-density difference B2.
Figure 9A:
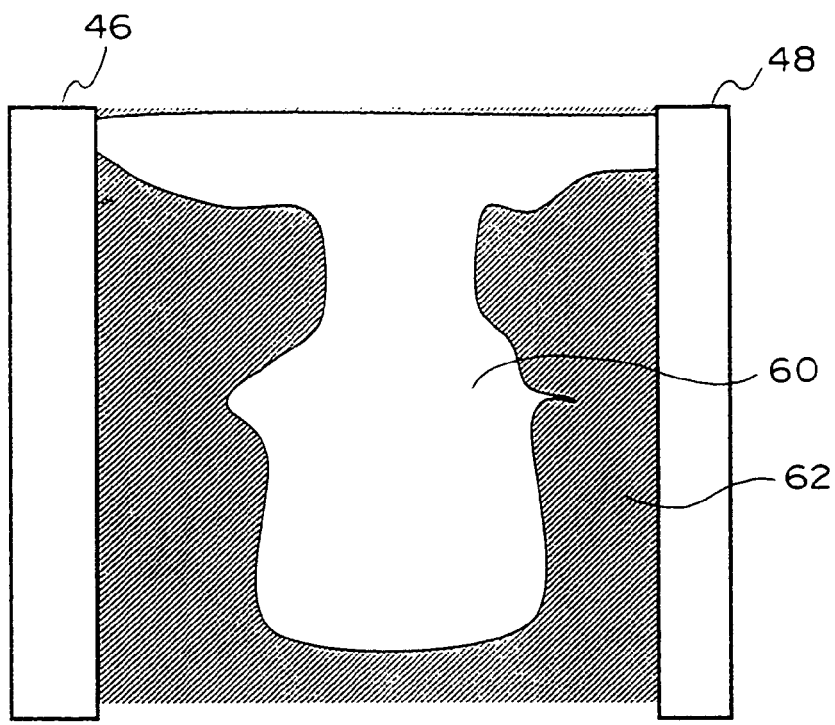
FIG. 9A is a schematic view illustrating the region in the particular region of Comparative Example 2 where the magnetic-flux-density difference B1 is not lower than the magnetic-flux-density difference B2 or more and the region where the magnetic-flux-density difference B1 is lower than the magnetic-flux-density difference B2.
Figure 9B:
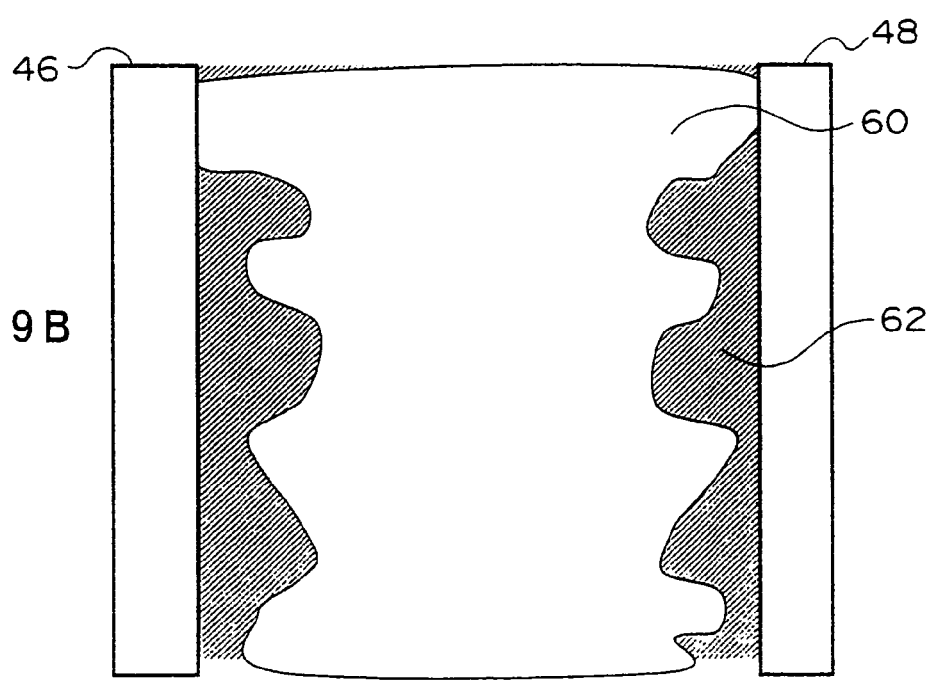
FIG. 9B is a schematic view illustrating the region in the particular region of Comparative Example 3 where magnetic-flux-density difference B1 is not lower than the magnetic-flux-density difference B2 or more and the region where the magnetic-flux-density difference B1 is lower than the magnetic-flux-density difference B2.

On the other hand, there are divided regions where the recording media prepared in Comparative Examples 1 to 3 are not detected by the gate device 34 in the multiple divided regions when they pass through the particular region 26, respectively as shown in FIGS. 7B, 9A, and 9B.

As apparent from FIGS. 7B, 9A, and 9B, there are more regions where it is not detected by the gate device 34 as the number of the magnetic wires contained in the recording medium decreases, i.e., more in Comparative Examples 3, 2, and 1 in that order, when the recoding media pass through the particular region 26.

Thus, the recording medium detecting system according to the invention provides a recording medium detecting system allowing accurate detection of a recording medium, by specifying the amount of magnetic wires contained in the recording medium so that the recording medium is detectable by the gate device 34 even when it is placed in any divided region of the particular region 26.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A recording medium detecting system comprising:
   a magnetic field-generating unit that generates an alternating magnetic field in a predetermined particular region;
   a detecting unit provided close to the particular region, that detects a change in magnetic flux density not smaller than a predetermined magnetic-flux-density difference B2; and
   a recording medium, containing multiple magnetic wires made of a magnetic material and formed in a wire shape having a predetermined length, that causes a large Barkhausen effect when the alternating magnetic field is applied,
   wherein a magnetic-flux-density difference B1 detected by the detecting unit at an installation position thereof when the recording medium is placed in the particular region is not smaller than the magnetic-flux-density difference B2.

2. The recording medium detecting system of claim 1, wherein, when the particular region is divided into multiple regions and the recording medium is positioned in each divided region, the magnetic-flux-density difference B1 detected at the installation position of the detecting unit is not less than the magnetic-flux-density difference B2.

3. The recording medium detecting system of claim 1, wherein the detecting unit further comprises a pulse-detecting unit provided close to the particular region that detects a flux reversal pulse generated when the flux of a magnetic material is reversed by the alternating magnetic field, and a magnetic-flux-density-difference detecting unit that detects a change in magnetic flux density not smaller than the magnetic-flux-density difference B2 based on the flux-reversal pulse detected by the pulse-detecting unit.

4. The recording medium detecting system of claim 1, wherein at least one of the amount, the length and the diameter of a cross section in a direction perpendicular to a magnetic wire length direction of the magnetic wires contained in the recording medium is specified in advance such that the magnetic-flux-density difference B1 becomes equal to or greater than the magnetic-flux-density difference B2.

5. The recording medium detecting system of claim 1, wherein a cross section of the magnetic wires in a direction perpendicular to a length direction is substantially circular in form, and the ratio of the length of the magnetic wires in the length direction to the diameter of the magnetic wire is approximately 100:1 or more.

6. The recording medium detecting system of claim 1, wherein the recording medium further comprises a paper substrate and a substrate containing magnetic wires.

7. The recording medium detecting system of claim 6, wherein the substrate is multilayered.

8. The recording medium detecting system of claim 7, wherein the multilayered substrate is prepared by dispersing magnetic wires between paper layers containing no magnetic wires.

9. The recording medium detecting system of claim 7, wherein the multilayered substrate comprises a paper layer containing magnetic wires and paper layers containing no magnetic wire holding the paper layer containing magnetic wires therebetween.

10. The recording medium detecting system of claim 1, wherein the recording medium comprises a paper substrate, a substrate containing magnetic wires, and a coat layer.

11. The recording medium detecting system of claim 1, wherein the magnetic wires are covered with an insulating layer.

12. The recording medium detecting system of claim 11, wherein the insulating layer is formed by a gas-phase deposition method.

13. The recording medium detecting system of claim 1, wherein the diameter of the magnetic wires is smaller than the thickness of the recording medium.

* * * * *